United States Patent
De Murcia et al.

[19]

[11] Patent Number: 5,889,525
[45] Date of Patent: Mar. 30, 1999

[54] PROCESS FOR THE RECONSTRUCTION OF THREE-DIMENSIONAL IMAGES ON A MOBILE OR DEFORMABLE OBJECT

[75] Inventors: Jérôme De Murcia, Grenoble; Pierre Grangeat, Saint Ismier, both of France

[73] Assignee: Commissariat a l'Energie Atomique, France

[21] Appl. No.: 668,702

[22] Filed: Jun. 24, 1996

[30] Foreign Application Priority Data

Jul. 3, 1995 [FR] France .................................. 95 08001

[51] Int. Cl.⁶ .......................................................... A61B 6/03
[52] U.S. Cl. .......................................................... 345/420
[58] Field of Search .................... 345/419–421; 600/425

[56] References Cited

U.S. PATENT DOCUMENTS

| | | | |
|---|---|---|---|
| 4,729,019 | 3/1988 | Rouvrais | 348/163 |
| 5,048,102 | 9/1991 | Tararine et al. | 382/300 |
| 5,163,094 | 11/1992 | Prokoski et al. | 382/118 |
| 5,531,227 | 7/1996 | Schneider | 600/425 |
| 5,611,026 | 3/1997 | Eberhard et al. | 345/419 |
| 5,627,918 | 5/1997 | Carasso | 382/254 |
| 5,633,951 | 5/1997 | Moshfeghi | 382/154 |
| 5,644,662 | 7/1997 | Vuylsteke | 382/302 |

FOREIGN PATENT DOCUMENTS

| | | |
|---|---|---|
| 0 521 559 | 1/1993 | European Pat. Off. . |
| 0 611 181 | 8/1994 | European Pat. Off. . |

OTHER PUBLICATIONS

Azhari, et al., "A Conical Model to Describe the Nonuniformity of the Left Ventricular Twisting Motion," *Annals of Biomedical Engineering*—vol. 20 (2), pp. 149–165 (1992).

*Primary Examiner*—Anton Fetting
*Attorney, Agent, or Firm*—Burns, Doane, Swecker & Mathis LLP

[57] ABSTRACT

Tomographic process for the reconstruction of three-dimensional images of an object such as the heart or another organ on the basis of sets of measurements relative to a group of different states of the object. An approximate image of the object in each state (f) is reconstituted on the basis of associated measurements and the movements of said object from a reference state to each of the states are evaluated ($D_k$). The estimation of the image of the object at the reference state ($\hat{f}_o$) is obtained by a convergence towards the real image by gradually incorporating in the estimated image information relative to the measurements and to the previously calculated movements of the object.

10 Claims, 3 Drawing Sheets

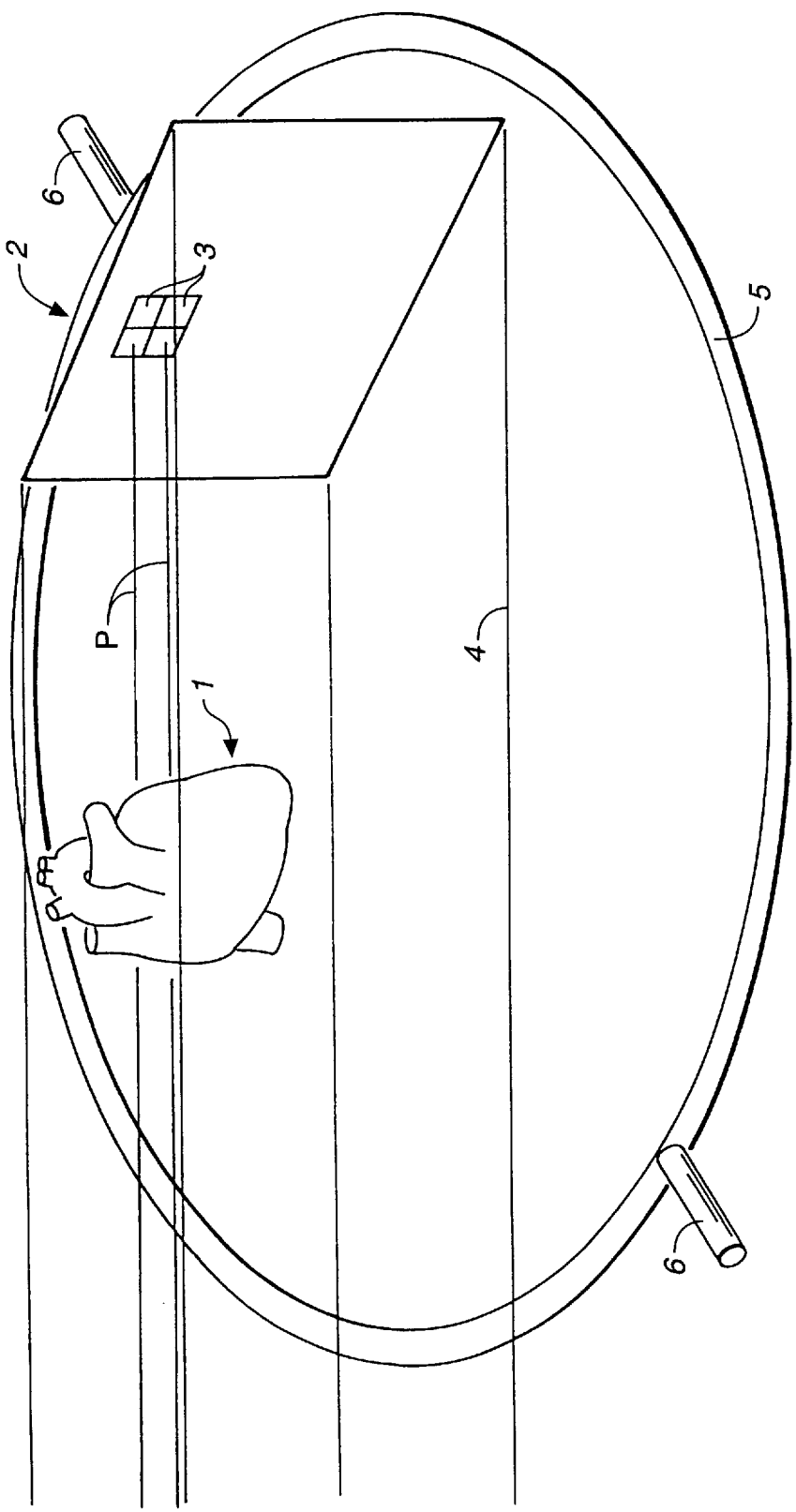
FIG._1

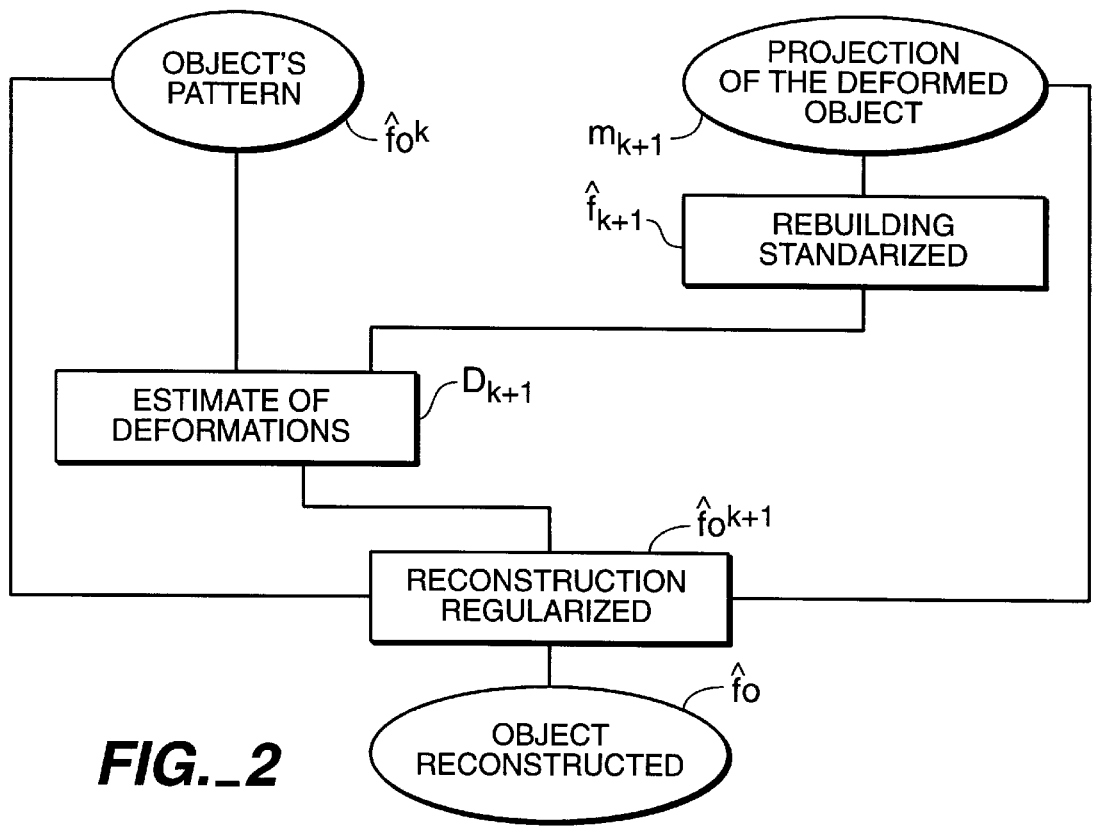
FIG._2
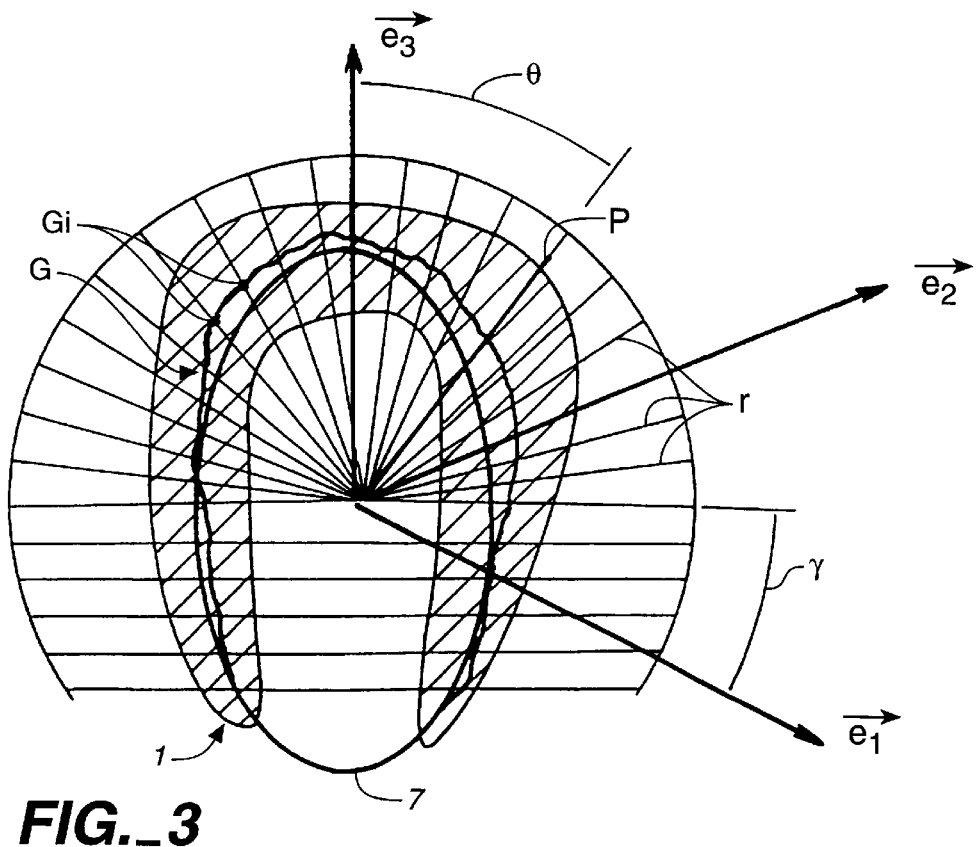
FIG._3

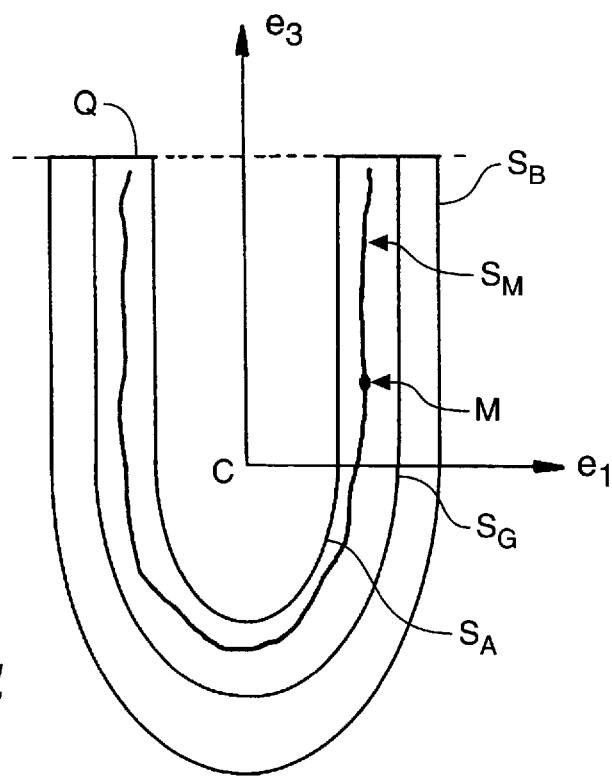
FIG._4
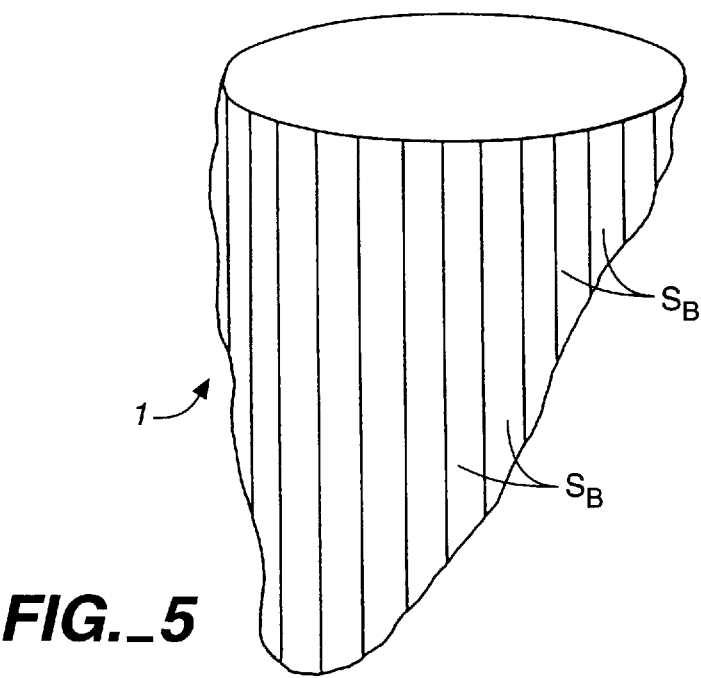
FIG._5

PROCESS FOR THE RECONSTRUCTION OF THREE-DIMENSIONAL IMAGES ON A MOBILE OR DEFORMABLE OBJECT

DESCRIPTION

The invention relates to a process for the reconstruction of three-dimensional images of a mobile or deformable object.

Three-dimensional imaging makes it possible to reconstruct the values of a particular parameter of the studied object after acquiring a series of two-dimensional projections of said object. In X-ray tomography, density informations are collected, because results representative of the linear attenuation of a radiation are obtained. In emission tomography, the local emission activity of a tracer or marker is calculated. Image reconstruction methods are also used in the case of the transmission of neutrons or the emission of γ radiation or positrons. Historically, firstly sections of objects were obtained with the aid of a detector line. At present, three-dimensional imaging consists of using arrays of two-dimensional detectors in order to deduce therefrom the content of the volume of the object.

The problems are much more complicated for three-dimensional images due to the larger information volume to be processed and possibly more varied geometrical situations to be considered. However, the problem to be solved can still be represented by the equation:

$$m = Hf + b \quad (1)$$

in which m designates all the measurements, f the image to be found, H the projection operator and b the measurement noise. Reconstruction is equivalent to the inversion of this equation, which can be solved by two families of methods. Analytical methods consist of exploiting a formula or an algorithm in which the measurements are combined with one another to obtain the values at the points of the image. Numerous examples exist, which frequently involve, e.g. when the sensors or transducers are focussed on a single focus defining a conical detection beam, the use of a Radon transform of the image, i.e. a mathematical function by which with each point of the measurement is made to correspond the sum of the measured property on all the points of a plane, known as the characteristic plane, passing through said point. One of the present inventors is the author of several earlier applications relating to these questions. Reference can in particular be made to European patent 292 402, which constitutes the basic invention in which the characteristics and properties of analytical inversion methods and in particular the Radon transform are described. A characteristic of these methods is that the discretization of the results obtained, in order to be able to associate them with the points of the image effectively retained by a discretization of the object, is produced at the end of the calculations.

Algebraic methods also exist in which the discretization of the image is performed at the outset, so that a system of equations is obtained, where each measurement is expressed as a function of the contribution of the points of the image traversing the scanning direction of the detector responsible for the measurement. The problem then amounts to the inversion of the projection matrix H. These methods are scarcely usable when there are numerous points, due to the extent of the calculations, but the problem can still be solved, which is not always possible with analytical methods, whose inversion formulas can be inadequate to obtain correct results. Another advantage of algebraic methods is that informations known beforehand or of an arbitrary nature can be much more easily introduced. If e.g. the content of part of the image is known beforehand, it is easy to directly introduce it into the equations, which is not the case with analytical methods. In practice, the inversion of the matrix is generally performed in accordance with standard iterative methods in digital analysis.

An important field for three-dimensional imaging is medicine and more particularly the examination of living organs. Movements of the patient are inevitable in the case of a mobile organ such as the heart, whose beats are accompanied by displacements and deformations. The problem consists of obtaining a coherent image of a series of measurements which, in ordinary processes, are successively accomplished by displacing the sensor or transducer array around the object.

A simple solution consists of arranging a large number of sensors around the patient, which are stationary and simultaneously take all the images used for the reconstruction. This avoids the problem of the mobility of the considered organ, but the equipment is made much more expensive as a consequence thereof.

Another, frequently used solution consists of only performing measurements at in phase instants during different cycles of the organ, but this is only possible for periodic phenomena and requires a certain synchronization precision, whilst lengthening the measurement taking period. Finally, it is possible to ignore the movements of the organ and make do with a blurred image. However, it is obvious that this also suffers from disadvantages.

Reference is also made to French patent 2 701 135, which has a common inventor to the present case and which provides a process for reconstructing the image of an object evolving between individual projection taking operations, in which the evolution law is known in an at least approximate manner and is incorporated in the calculations in order to give the image of the object at a random instant. The same result is obtained here, but under different conditions, because the evolution law is assumed to be unknown and must be found. Moreover, the earlier-dated patent relates to algebraic inversion methods, whereas the present invention is based on analytical methods. In addition, here several sets of projections are made in each state at different incidences around the object.

The invention aims at obtaining satisfactory imaging results without making the apparatus more complicated, using a process involving, in the chosen implementation, iterations improving a model of the image reducing the effect of deterioration due to the acquisition conditions (noise effects, defects, etc.) for reconstructing an approximate or unprocessed image, due to it being very noisy in practice, associated with each set of measurements and consisting of determining the displacements and deformations of the object for said set of measurements, in order to include the results of different approximate images in the model.

In summarizing, it is a process comprising taking a series of sets of measurements of a characteristic property of the object by a two-dimensional array of mobile sensors around the object, the sets of measurements consisting of a two-dimensional array of projections of the property on the sensors, the sets of measurements being taken at a group of different states of the object with respect to the variations in the position or shape of the object, consisting of reconstructing an approximate image of the object at each of the states, combining their respective sets of measurements, characterized in that it then consists of evaluating the variations of the object between an image of the object at a reference state and the approximate images, and modifying the image of the object at the reference state by a combination with the sets of measurements and the variations of the object associated with the sets of measurements.

Advantageously, the variations of the object are estimated by a displacement field of modelling points of the object and by an evolution of the property respecting a continuity relation of the property in time. They can be estimated by variations in contours of the object modelled by simple geometrical shapes of an invariable nature. Moreover, if the object is subject both to deformations and displacements, it is possible to decide that the overall displacements and deformations are evaluated separately with different modellings of the object.

Another aspect of the invention consists of combining the measurement sets taking account of noise effects of the measurements and noise effects of the evaluations of the variations of the object.

The invention is described in greater detail hereinafter relative to the attached drawings, wherein show:

FIG. 1 The taking of measurements.

FIG. 2 Summarizes the process.

FIG. 3 A first modelling of a heart muscle.

FIGS. 4 & 5 A second heart muscle modelling.

FIG. 1 illustrates a frequent study object, namely a heart 1 and more specifically its heart muscle, supplied by a liquid enriched with a photon emitting, radioactive tracer. The measurements are taken by a two-dimensional array 2 of sensors or transducers 3, which are collimated in the same direction. Thus, they collect photons emitted on projection lines p, which are parallel to one another. All the projections extend in a beam 4 of constant section in which the heart 1 is placed. The two-dimensional array 2 is mobile around the core 1 sliding on a rail 5, which is circular or has some other shape, and which can tilt about pivots 6 in order to assume a random inclination. The sensors 3 having different incidences take a series of sets of measurements being receptive to photons at certain instants, synchronized on a given group of states of the heart 1, or the phases of its cycle. The means for the synchronization, control of sensors 3, displacement of the two-dimensional array 2 and the storage of measurements, which are already known, will not be described here.

The constant section beam is of a conventional nature with emitted photon detection processes. The invention also applies to processes characterized by different, conical or fan-shaped beams and only the coefficients of the projection matrix R vary.

A detailed explanation of the process used follows. The series of sets of successive measurements corresponds to different states of the object, whose order number is represented by the index k (positive integer), in which k=0 designates the state in which the image has to be reconstructed. The object can e.g. be discretized in M points forming a cube of M side points. The image of the object in each state can be represented by a vector column with M components, the deformation operator of the object between state 0 and state k by a square matrix of dimension $M^3$ designated $D_k$ and the measurements can be represented by a column vector of projections $m_k$ with $LxM^2$ components. It is assumed that there are $M^2$ sensors, which collect the same number of projections passing through a line of M object modelling points and that L sets of measurements have been taken for the same state of the object, at different incidences, by synchronizing the sets of measurements on cycles of the object. As the projections suffer from a noise $b_k$ and as $w_k$ is used to designate a noise representing the deformation operator error, the following pair of equations can be written:

$$\begin{cases} f_k = D_k f_0 + w_k, \\ m_k = R f_k + b_k \end{cases} \qquad (2)$$

$f_k$ and $f_0$ being the real images of the object at states k and 0 and R the projection matrix of the measurements.

According to the invention, the sets of measurements are successively entered in the calculations in order to reconstruct on each occasion an estimate of the image, designated $\hat{f}_0^{k+1}$ when state k+1 has been considered and attempt to improve and approach $f_0$. Specifically, the following equation is applied:

$$\hat{f}_0^{k+1} = \hat{f}_0^k + K_{k+1} \epsilon_{k+1}. \qquad (3)$$

This formulation of the problem reveals several magnitudes defined in the following way:

$$K_{k+1} P_k D_{k+1}^t R^t P^-_{\epsilon_{k+1}} \text{ with } P_{k+1} = P_k (I - D_{k+1}^t R^t P_{\epsilon_{k+1}}^{-1} R D_{k+1} P_k) \qquad (4)$$

and $P_{\epsilon_{k+1}} = R D_{k+1} P_k D_{k+1}^t R^t + R C_{w_{k+1}} R^t + C_{b_{k+1}}$;

and $\epsilon_{k+1} = m_{k+1} - R D_{k+1} \hat{f}_0^k$ $P_k$ designates an estimate matrix of the error between the image estimate obtained $\hat{f}^{k+1}$ and the real image $f_0$. Pk is calculated recurrently for each set of projections from a primitive value $P_{-1}$ arbitrarily introduced by the operator and which is in practice formed by a matrix, whose coefficients are very high. $P_{\epsilon_{k+1}}$ designates the matrix expressing the noise between the estimate of the preceding image $\hat{f}_0^k$ (once deformed at state k+1 by the operator $D_{k+1}$ and projected) and the set of projections $m_{k+1}$ corresponding to the state k+1. The matrixes $Cb_k$ and $Cw_k$ designate the covariance matrix of the noises $b_k$ on the projections and $w_k$ on the deformation operator, as defined hereinbefore. These noises are not known and must be estimated by the operator on the basis of his experience and observations. The noise $b_k$ can be evaluated on each projection image by a spectral density analysis considering the high frequencies and assuming white noise. It is pointed out that the covariance matrix of a phenomenon X of mean value $\bar{X}$ (expressed in matrix form) is defined by $$C(X) = E(X - \bar{X})^t \cdot (X - \bar{X}) \qquad (5)$$

in which E designates the statistical expectation. Finally, t represents the transposed matrix.

This process amounts to applying at each recurrence a Tikhonov regularization so that $\hat{f}_0^{k+1}$ minimizes the cost function:

$$E(f) = \Delta_1^{k+1}(RD_{k+1} f, m_{k+1}) + \Delta_2^{k+1}(f, \hat{f}_0^k) \qquad (6)$$

where:

$$\Delta_1^{k+1}(x,y) = (x-y)^t (RC_{w_{k+1}} R^t + C_{b_{k+1}})^{-1}(x-y) \Delta_2^{k+1}(x,y) = (x-y)^t P_k^{-1}(x-y) \qquad (7)$$

in which $\Delta_1$ and $\Delta_2$ are standards expressing the variation between the measurements and the solution found and the variation between the solution $f_0$ and the reconstructed image $\hat{f}_0^k$.

The performance of all these calculations makes it necessary to find the deformation operator $D_{k+1}$. For this purpose use is made of the previously obtained image estimate $\hat{f}_0^k$ and an approximate image $\tilde{f}^{k+1}$ of the object at state k+1 with the aid of projections $m_{k+1}$ taken into consideration, using a conventional three-dimensional image reconstruction algorithm, known as reprojection, with respect to the filtered projections. There are L sets of $M^2$ measurements for each state, which makes it possible to reconstitute the approximate image $\tilde{f}^{k+1}$. The comparison between the approximate image in state k+1 $\tilde{f}^{k+1}$ in which it is possible to see the shape and position of the sought object and the actual image estimate $\hat{f}_0^k$ of the object in state 0 with sets of measurements of states 0 to k makes it possible to deduce this deformation operator $D_{k+1}$. This stage, which is one of the characteristics of the invention, is described hereinafter.

The estimate of the following image of the object $\hat{f}_0^{k+1}$ is reconstructed from the actual image estimate $\hat{f}_0^k$, the set of projections $m_{k+1}$ and the deformation operator $D_{k+1}$ by applying the preceding equations. Thus, there is a stepwise approach to the real image $f_0$, in order to obtain a final image $\hat{f}_0$ representing state 0. FIG. 2 summarizes the process.

A more detailed examination will now take place as to how to define the deformation operator $D_k$ when examining the heart muscle. As will be shown, the choice of object or organ tends to impose a diagrammatic form of its shape for modelling it and for carrying out the calculations in an appropriate form, but other modellings could be used for other organs.

In the case of a mono-photon emission tomography process (MPET), generally used for studying the operation of an organ and where a radioactive product is administered to said organ, the conventional process for isolatin it on the approximate image, directly reconstituted, $\tilde{f}^{k+1}$, firstly consists of manually selecting a portion of the image including it and then moving aside the foreign parts of the image which are left by an activity threshold criterion. More specifically, moving apart takes place of the portions, whose activity is below a generally 35% proportion of the maximum activity location. Thus, apart from the actual organ, there can be residual objects of smaller size which are then removed, which eliminates false detections associated with noise and reconstruction defects. It is therefore possible to automatically eliminate objects, whose size, measured on the basis of their surface area on the image, is less than 30% of the size of the main object.

In the case where it is possible to consider that the overall emission activity per image remains constant in time, the continuity equation:

$$\partial a/\partial b + \nabla \cdot (a \vec{v}) = 0,$$

frequently encountered in continuum and fluid mechanics is respected, a(M,t) and $\vec{v}$(M,t) designating the emission activity density and speed of the object at a point M and at a time t. $\nabla$ designating the divergence operator. $V_k$ is the field of motions $\vec{v}_k$ (M) of points M of the object or the original state (k=0) at state k. It possible to break down this movement by the equation:

$$\vec{v}(M) = \vec{v}(C) + \vec{\Omega} \wedge C\vec{M} + \vec{D}(M) \tag{8}$$

in which C is the centre of inertia of the object (heart muscle), $\vec{v}(C)$ and $\vec{\Omega}$ the translation and rotation components of the torsator of the rigid motion field of the object and $\vec{d}(M)$ the non-rigid motion expressed in a reference frame linked with the object, i.e. the actual deformations.

In the case of the heart muscle, this reference frame has for its origin and for directional axes the centre C and the major axes of an ellipsoid used for modelling the barycentric surface of the heart muscle between its inner and outer surfaces (endocardium and pericardium). This surface can be defined in spherical coordinates for the tip or apex of the heart and cylindrical coordinates for the base of the heart. This system of coordinates is designated ($\rho$, $\phi$,.) by the equation:

$$\rho G(\phi G,.) = \frac{\int_0^{\rho max} a(\rho, \phi G,.) \rho d\rho}{\int_0^{\rho max} a(\rho, \phi G,.) d\rho} \tag{9}$$

in which a($\rho,\phi G$,.) designates the emission activity at the coordinate point ($\rho$,100 G,.) and $\rho$max designates the maximum scanning distance. For any angular coordinate ($\phi G$,.), the point of the barycentric surface consequently has the radial coordinate $\rho G$.

This method would appear to be more precise than others, if the heart has a vascularization defect and in particular methods based on seeking the major moments of inertia. Thus, the activity defects which then appear can more easily disturb the results of the calculations.

The drawing shows a heart muscle in section, the ellipsoid able to model the barycentric surface and the heart muscle for the estimation of its overall motion and the sampling adopted, which is hemispherical on the side of the apex of the heart muscle and cylindrical on the side of its base. For said part, the determination lines of the barycentric surface G are parallel. These lines along which the points $G_i$ are determined are all designated r.

Thus, firstly there is a calculation of the points Gi of coordinates $x_i$, $y_i$ and $z_i$ of the barycentric surface G with the aid of the above formula, followed by the calculation of the parameters of the closest ellipsoid 7 to said surface by defining the error function:

$$\sum_{i=1}^{N} (1 - \Gamma(x_i, y_i, z_i))^2 \tag{10}$$

in which N designates the number of points $G_i$ of the barycentric surface G and $\Gamma(x,y,z)$ is the equation of an ellipsoid, i.e.

$$\Gamma(x,y,z) = a_0 x^2 + a_1 y^2 + a_2 z^2 + a_3 xy + a_4 xz + a_5 yz + a_6 x + a_7 y + a_8 z = 1 \tag{11}$$

The system obtained is solved to obtain the coefficients $a_0$ to a8 until the minimum of this error function is obtained. A new reference frame is associated with the ellipsoid obtained, which evolves other lines for the scanning and calculation of the coordinates of the points $G_i$. In practice, the process is recommenced by successive iterations until the position and orientation variations of the axes of the reference frame associated with the ellipsoid 7 and which devolve from the coefficients $a_0$ to $a_8$, becomes imperceptible in view of the resolution of the image. For the first iteration the ellipsoid 7 and the associated reference frame are obtained by solving the error equation with all the points of the image of the heart muscle in the absence of lines permitting the calculation of a barycentric surface.

The axes shown in the drawing are then obtained. The axis $\vec{e}_3$ is then directed in the major axis of the ellipsoid towards the apex of the heart muscle. The origin C is the centre of the ellipsoid.

Once the reference frame has been calculated for the image k, the overall translation motion between states 0 and k is defined by the vector $\vec{C^0 C^k}$ and the rotation matrix is calculated by the product of the components of the two vectors $$[\vec{e}_1^k, \vec{e}_2^k, \vec{e}_3^k].[\vec{e}_1^o, \vec{e}_2^o, \vec{e}_3^o].$$

The non-rigid motion can be estimated from the contours of the heart muscle and the barycentric surface G. A less diagrammatic modelling of the heart muscle is henceforth used. The endocardium and pericardium are modelled by rifle bullet surfaces, i.e. half-ellipsoids of revolution at the end and cylindrical of revolution at the base. The position of these surfaces is established by seeking the parameters of these surfaces making it possible to maximize the integral on said surfaces of the quadratic standard of the emission property gradient. As only the organ emits photons, the emission variation is highest on traversing the inner and outer surfaces thereof and consequently surfaces with a simple shape are sought, which best prove this property. The parameters necessary for defining the two rifle bullet surfaces re five in number (the height of the cylinders and the measurements of the ellipsoids at the major axes). If a is the half-measurement of the ellipsoids along their minor axes (perpendicular to $\vec{e}_3$), c their half-measurement along their major axis $\vec{e}_3$, A the index of the endocardium, B the index of the pericardium and h the height of the cylinders, the calculations take place by varying $a_A$, $a_B$, $c_B$ and by convention we establish $c_A=1.5a_A$, because this parameter is difficult to calculate. In addition, parameter h cannot be easily directly obtained. For this purpose the approximate image $\hat{f}^{k+1}$ is broken down into sections passing through the axis $\vec{e}_3$, in which $\phi$ is constant and for each of these sections the gradient of the activity along the surface between curves $S_A$ and $S_B$ modeling the endocardium and pericardium are measured. The plane Q at which the cylinder stops corresponds to the maximum gradient of the activity, summated over all the sections. All this is shown in FIG. 4.

It is then possible to completely define a modelling $S_G$ of the barycentric surface G, which is a rifle bullet surface defined by the equations:

$$S_G \begin{cases} \Gamma(x, y, z) = a_0 x^2 + a_1 y^2 + a_2 z^2 \text{ if } z \geq 0 \\ \Gamma(x, y, z) = a_0 x^2 + a_1 y^2 \text{ if } -h \leq z \leq 0. \end{cases} \quad (12)$$

With each heart muscle point M can be made to correspond a rifle bullet-shaped surface intermediate of $S_A$ and $S_B$ and defined by new parameters a and c, h remaining identical. Following an expansion or contraction deformation, point M, of coordinates x, y and z, becomes a point M' of coordinates x', y' and z' present on a surface of the same shape and defined by the parameters a', c' and h' such that:

$$x'=(a'/a)x, \ y'=(a'/a)y \text{ and } z'=[(c'+h')/(c+h)]z. \quad (13)$$

On modelling in the manner illustrated in FIG. 5, the deformed heart muscle as a superimposition of unequally expanded rifle bullet-shaped portions, the deformation displacements of point M between states 0 and k+1 along the three axes can be expressed by the following formulas:

$$d(M) \begin{cases} d(x) = \left(\dfrac{a'}{a} - 1\right) x \\ d(y) = \left(\dfrac{b'}{b} - 1\right) y \\ d(z) = \left(\dfrac{c'+h'}{c+h} - 1\right) z \end{cases} \quad (14)$$

More precisely, the coefficients a, b and c associated with the point M obey proportionality relations with like coefficients of the barycentric surface on the one hand and the surface modelling either the endocardium or the pericardium on the other. The coefficients a', b' and c' associated with point M' obey the same relations with coefficients of the same modelling surfaces in the deformed state.

It is necessary to add to these deformations the overall displacements in order to obtain the complete movement at each point of the heart muscle.

The following stage consists of defining the operation of the deformations $D_{k+1}$ between state 0 and state k+1. No intermediate state is involved in the calculation, which reduces numerical errors. The activity at state k+1 of the point M(x,y,z), i.e. a(M,k+1), is equal to the sum of the activities of the points $M_i$ at state 0, $a(M_i,0)$ arriving in the vicinity of M after a complete movement of the coordinates $v_x(M)$, $v_y(M)$ and $v_z(M)$ of M, with a weighting in accordance with the formula:

$$a(M, k+1) = \Sigma \ \alpha_i a(M_i, 0)$$

and $$\alpha_i = (1 - \epsilon_{ix})(1 - \epsilon_{iy})(1 - \epsilon_{iz})$$

where $$\begin{cases} \epsilon_{ix} = |x - (x_i + v_x(M_i))| \text{ if } |x - (x_i + v_x(M_i))| \leq 1; 0 \text{ otherwise} \\ \epsilon_{iy} = |y - (y_i + v_y(M_i))| \text{ if } |y - (y_i + v_y(M_i))| \leq 1; 0 \text{ otherwise} \\ \epsilon_{iz} = |z - (z_i + v_z(M_i))| \text{ if } |z - (z_i + v_z(M_i))| \leq 1; 0 \text{ otherwise} \end{cases} \quad (15)$$

It is pointed out that the overall activity of the object is identical for each state. Thus, even if it decreases for each measurement due to the depletion of the radioactivity, the states are all measured several times at successive instants and the measurements of the different states are intermixed so that certain are early and others are late for each of them. It is in this sense that the continuity equation is respected in this process.

It is possible to conceive other ways of obtaining movements of points of the object, although the aforementioned procedure would at present appear to be the best. Another is described in the article "Computation of 3-D velocity fields from 3-D cine CT images of a human heart" by Song and Leahy, published in IEEE Transactions on Medical Imaging, vol. 10, No. 3, September 1991, pp 295–306.

The calculation of the image $\hat{f}^{k+1}$ involves the inversion of the matrix $P\epsilon_{k+1}1$, in accordance with the above formula which gave $K_{k+1}$. This very large size matrix cannot be in general directly inverted and another process is then used.

On the basis of the aforementioned hypotheses, $(f_0-\hat{f}_0^{k+1})$ and $\epsilon_{k+1}$ are random vectors of zero mean value and whose covariance matrixes are $P_{k+1}$ and $P\epsilon_{k+1}$. These covariance matrixes can be approached or approximated by circulating block matrixes which can be diagonalized according to the following formulas:

$$P\epsilon_{k+1}=W_m P\epsilon_{k+1 1}W_m^{-1} P_{k+1}=W_0 P_{k+1} W_0^{-1} \quad (16)$$

$W_m$ is a matrix of dimensions $LM^2 \times LM^2$ such that:

$$\omega_m = \begin{pmatrix} W_m & \cdots & 0 \\ \cdot & \cdot & \cdot \\ \cdot & \cdot & \cdot \\ \cdot & \cdot & \cdot \\ 0 & \cdots & W_m \end{pmatrix} \quad (17)$$

$W_m$ is a square matrix of dimensions $M^2 \times M^2$, so that if X represents a two-dimensional image with $M^2$ points, the product $W_m^{-1}X$ is the two-dimensional discreet Fourier transform of X. $P\epsilon_{k+1}$ is a diagonal block matrix, whereof each block is a diagonal matrix of dimensions $M^2 \times M^2$, whose diagonal elements are the spectral densities of the noise between the projections and the calculation thereof on the basis of the deformations and the image estimate of value $m_{k+1} \times RD_{k+1} \hat{f}_0^k$. $W_0$ is a matrix of dimensions $M^3 \times M^3$, so that if X represents a three-dimensional image of $M^3$ points, $W_0^{-1}X$ is the three-dimensional, discreet Fourier transform of $X_i$. $P_{k+1}$ is a diagonal matrix, whereof the diagonal elements are the spectral densities of the estimate error $(f_0 - \hat{f}_0^{k+1})$ Under these conditions, the product $K_{k+1}\epsilon_{k+1}$ is at $W_0 P_k W_0^{-1} D_k^t + 1$ $$R^t W_m P_{\epsilon_{k+1}} W_m^{-1} \epsilon_{k+1} \quad (18)$$

As the heart muscle is virtually incompressible, the product $D_k D_k$ is close to the identity matrix. For a group of parallel projections, the following equation is finally obtained from $\hat{f}_0^{k+1} = \hat{f}_0^k + K_{k+1}\epsilon_{k+1}$, using the properties of the projection operation R and operators $W_m$ and $W_0$:

$$\hat{f}_0^{k+1} \hat{f}_0^k + D_{k+1}^{-1} R^t \Phi_{k+1} (m_{k+1} - RD_{k+1} \hat{f}_0^k) \quad (19)$$

in which $R^t$ and $\Phi_{k+1}$ respectively designate a retroprojection and a bank of L monodimensional filters, each being defined by a transfer function independent of the projection angle 1, said function being defined by:

$$\Phi_{k+1}^l(v) = \frac{\Gamma_k(v)}{\Gamma \epsilon_{k+1}(v)} \quad (20)$$

in which $\Gamma_k(v)$ and $\Gamma \epsilon_{k+1}(v)$ designate the spectral densities of $P_k$ and $P_{\epsilon_{k+1}}$ moreover, $$\Gamma_{k+1}(v) = \Gamma_k(v) = \Gamma_k(v)\left(1 - \frac{\Gamma_k(v)}{|v| S \epsilon_{k+1}(v)}\right) \quad (21)$$

and $$\Gamma \epsilon_{k+1}(v) = \frac{\Gamma_k(v)}{|v|} + \frac{\Gamma w_{k+1}(v)}{|v|} + \Gamma b_{k+1}(v),$$

$\Gamma_{k+1}$ and $\Gamma b_{k+1}$ designating the spectral densities of $w_{k+1}$ and $b_{k+1}$.

In practice and taking account of the properties of the projection operation R and the symmetry of revolution of $\Phi_{k+1}^1(v)$, the preceding equation amounts to $$\Psi_{k+1}(v_x, v_y, v_z) = \frac{\Phi_{k+1}^l\left(\sqrt{v_x^2 + v_y^2}\right)}{\sqrt{v_x^2 + v_y^2}}; \quad (22)$$

and the effective reconstruction process is completed by solving the latter equation.

In summarizing, at each iteration k+1, the measurements $m_{k+1}$ are filtered by the transfer function filter $\Phi_{k+1}^1$ translating the confidence in said data and the estimation of the deformations, then retroprojected and deformed by the operator $D_{k+1}^{-1}$ in order to be reset on the state 0, whose image is restored. This image $\vec{f}_0^{k+1}$ is then the sum of the reconstructed deformed and filtered measurements and the model filtered by the transfer function filter $(1 - \Psi_{k+1})$ operating a weighting between the measurements and the informations a priori. The filters $\Phi$ and $\Psi$ are updated as a function of the noise of the sets of measurements and the modellings of the deformations. The process is initialized with $\hat{f}_0^{-1} = 0$ to $-1 = 0$ and $P_{-1} = \sigma_{-1}^2 I$ where $\sigma_{-1}$ is a very large number, which can be likened to infinity.

The reference state corresponding to the solution $f_0$ is freely chosen. It can correspond to an effective measurement taking state or a conventionally chosen state such as a primitive state defined by a modelling and henceforth inaccessible. It is possible to replace the definitively obtained image $\hat{f}_0$ making use of the deformation operator $D_k$.

Preliminary tests have shown that the combination of image informations of the object at various states, characteristic of the invention, gave much more clear images than conventional reconstructions, where only measurements synchronized on a single state of the object were taken. In other words, the image $\hat{f}_0^k$ is better than $\hat{f}0$ (or $\hat{f}_0^0$), this improving as k increases.

However, there can be a random number of states. The invention can even be used with advantage for a single measurement taking state, provided that initial information is available associated with a reference state. The reconstructed image enriched with said information can be advantageously brought into the measurement taking state, because it is normally more precise than the approximately image $\hat{f}_O$.

Certain of the above remarks have applied to medicine, but another application is industrial non-destructive testing, where measurements are deformed states and the reference state a state defined by planes or a modelling, without any deformation.

We claim:

1. Process for the reconstruction of three-dimensional images of an object comprising taking a series of sets of measurements (m) of a characteristic property of the object (1) by a two-dimensional array (2) of sensors (3) mobile around the object the sets of measurements (m) consisting of a two-dimensional array of projections (p) of the property on the sensors, the sets of measurements being made with a group of different status (k) of the subject with regard to variations in the position or shape of the object, consisting of reconstructing an approximate image (f) of the object oat each of the states combining their respective measurement sets. characterized in that it then consists of evaluating $(D_k)$ the variations of the object between an image of the object at a reference state and the approximate images and modifying the image of the object at the reference state $(f_0)$ by a combination withe sets of measurements $(m_k)$and variations $(D_k)$ of the object associated with the measurement sets characterized in that the variations of the object are estimated by variations of contours of the object modelled by simple geometrical shapes $(S_A, S_B)$ and of invariable nature.

2. Process for the reconstruction of three-dimensional images of an object according to claim 1, characterized in that the object is modelled in the form of points (M) present on simple geometrical shapes $(S_M)$ and of invariable nature and similar to that of geometrical contour modelling shapes.

3. Process for the reconstruction of three-dimensional images of an object according to claim 1, characterized in that the object is a heart muscle (1) modelled by a hemisphere extended by a cylinder in the reference state and by a stack of modelling portions, each formed by a half-ellipsoid extended by a cylinder in the approximate image states.

4. Process for reconstructing a three-dimensional image of an object subjected to time-varying displacements and/or deformations, comprising the steps of:

selecting a time reference;

taking a series of sets of measurements of the object by a two-dimensional array of sensors mobile around the object at different measurement times at which the object assumes respective measurement states according to the displacements and/or deformations;

for each set of measurements, obtaining an approximate image of the object at the corresponding measurement time out of said sets of measurements;

selecting an approximate image of the object at the reference time, corresponding to a reference state of the object;

evaluating relationships between the reference state and each of the measurement states of the object, said relationships comprising displacements of points of the object between the reference state and the measurement states, respectively; and repeatingly altering the approximate image of the object at the reference state with an algorithm in which contents of the approximate images obtained at previous measurement times and contents of an update of said approximate image defined by the relationship at a current measurement time are merged successively;

wherein the displacements of points of the object in the relationships are estimated in modelling the object by simple geometrical shapes ($S_A$, $S_B$) which keep an invariable nature throughout the reference and measurement states and the displacements of points of the object being evaluated from displacements of contours of said simple geometrical shapes.

5. A process according to claim 4, wherein the relationships comprise an estimated evolution of physical property, the property being measured by the sensors, the evolution being continuous according to time.

6. A process according to claim 4, wherein the object is modelled with points (M) present on surfaces which have a nature similar to the nature of the geometrical shapes that model the object.

7. A process according to claim 4, wherein the object is a heart muscle modelled by a stack of layers, each of the layers comprising a half-ellipsoid extended by a cylinder in the measurement states, the layers being arranged together in a hemisphere extended by a cylinder in the reference state.

8. A process according to claim 4, wherein the displacements of the object comprise overall displacements and local displacements, the local displacements producing the deformations, wherein the overall displacements and local displacements are evaluated separately using different modellings of the object.

9. A process according to clim 4, wherein the approximate image of the object is altered in taking account of noise (b,w) in the measurements and noise in the relationship.

10. A process according to claim 4, wherein the object is assumed to be incompressible.

* * * * *